United States Patent [19]
Barroso

[11] Patent Number: 5,085,304
[45] Date of Patent: Feb. 4, 1992

[54] AUTOMATIC FREE-WHEELING HUB ASSEMBLY

[75] Inventor: Elton Barroso, Sao Paulo, Brazil

[73] Assignee: AVM Auto-Equipamentos, Ltda., Brazil

[21] Appl. No.: 516,199

[22] Filed: Apr. 30, 1990

[51] Int. Cl.⁵ .............. F16D 25/061; B60K 23/08
[52] U.S. Cl. ................... 192/67 R; 192/85 A; 180/247; 403/1
[58] Field of Search .......... 192/67 R, 85 A, 85 V, 192/88 A; 180/247; 403/1

[56] References Cited

U.S. PATENT DOCUMENTS

| | | |
|---|---|---|
| 4,282,949 | 8/1981 | Kopich et al. ............ 180/247 X |
| 4,293,061 | 10/1981 | Brown .................... 192/85 A X |
| 4,627,512 | 12/1986 | Clohessy ................. 192/85 V X |
| 4,817,752 | 4/1989 | Lobo et al. ............. 192/67 R X |
| 4,928,804 | 5/1990 | Wakabayashi ............. 180/247 X |
| 4,960,192 | 10/1990 | Kurihara ................ 192/85 V X |

Primary Examiner—Richard Lorence
Assistant Examiner—Andrea Pitts
Attorney, Agent, or Firm—Gossett Dykema

[57] ABSTRACT

A diaphragm control is disclosed for a free-wheeling hub assembly that selectively engages a four-wheel drive. A venting arrangement is disclosed for the diaphragm chamber of the free-wheeling hub assembly. The venting arrangement extends through the body of the free-wheeling hub assembly to a space within the engine compartment of the vehicle thus ensuring that the vent will not become clogged thus preventing the venting of the diaphragm chamber. Venting of the diaphragm chamber is important in predicting the pressure within the diaphragm chamber and thus the engagement of the free-wheeling hub assembly.

16 Claims, 2 Drawing Sheets

AUTOMATIC FREE-WHEELING HUB ASSEMBLY

BACKGROUND OF THE INVENTION

This invention relates to an improvement in free-wheeling hub assemblies for four-wheel drive vehicles. More particularly, it relates to an improvement in venting a diaphragm chamber to atmosphere such that the position of the diaphragm can be accurately controlled.

Modern four-wheel drive vehicles have a pair of free-wheeling hub assemblies for selectively driving all four vehicle wheels. In some free-wheeling hub assemblies, the connection of a drive shaft to the hub assembly to drive the hub assembly is controlled by a diaphragm. A hydraulic chamber positions the diaphragm in order to engage and disengage the hub assembly from the drive shaft in response to commands to selectively drive the associated wheels. A free-wheeling hub assembly is disclosed in U.S. Pat. No. 4,625,846 to Gomez and is assigned to the assignee of the present invention. This patent is expressly incorporated by reference and will fully explain and disclose the operation of the free-wheeling hub assembly of this invention.

In a prior art free wheeling hub assembly, an external body is connected to rotate with a wheel hub. A cylindrical axle hub is received within the external body and has internal splines that are received in external splines formed on the axle shaft. Snap rings secure a bearing to the outer periphery of the cylindrical axle hub. The wheel hub and axle shaft may rotate relative to each other upon this bearing, while the vehicle is in two-wheel-drive mode.

The wheel hub will typically receive a rim and tire and is one of the selectively driven wheels of a four-wheel drive vehicle. The operator of the vehicle may selectively engage the two wheels that have the free-wheeling hub assemblies to provide four-wheel drive to the vehicle.

An external toothed section on the cylindrical axle hub is associated with internal teeth on a clutch ring. The clutch ring has locking teeth that are received within slots or grooves in the inner periphery of the external body to rotate the external body along with the clutch ring when it is driven to rotate by the axle hub. Due to the teeth on the clutch ring it can slide longitudinally within the external body. The clutch ring can also slide on the externally toothed section of the axle hub.

Radial projections connect an actuating disc to the clutch ring and a central rivet connects a diaphragm to the actuating disc. A disc or backing member receives the central rivet and prevents the diaphragm from being torn. In addition, the disc has a cylindrically upstanding portion that will abut an end wall of the external housing and prevent excess deformation of the diaphragm. The upstanding portion is a stop means for the diaphragm. A spindle receives the axle shaft within its inner periphery and the wheel hub outside its outer periphery. The spindle is fixed to the vehicle frame. An oil seal seals the end of the spindle from atmosphere. A radially extending flange is formed extending from the spindle outwardly. A seal is received between the spindle and wheel hub. A bearing is received within the spindle and supports the axle.

Fluid, which may be hydraulic pressure, air or vacuum pressure is communicated to a control pressure chamber in one of two ways. In one embodiment, a tube is received in an orifice formed in the spindle. The tube is communicated to a canal or passage which communicates with a radial spacing between the axle shaft and the inner periphery of the spindle. From this radial spacing, fluid is communicated into the chamber to control the pressure within the chamber.

Alternatively, a passage is formed within the inner periphery of the axle shaft and communicates the fluid to the chamber through the axle shaft.

A vent opening is formed in the end wall of the external housing and will allow venting of the pressure within a diaphragm chamber. A powdered metal filter is received within the vent opening.

A spring will bias the diaphragm to a position in opposition to the pressure with the control pressure chamber. If a high pressure fluid is sent to the control pressure chamber, the spring will bias the diaphragm away from the end wall. If a vacuum pressure is utilized, the spring will bias the diaphragm toward the end wall.

The basic operation of this prior art device will be explained. When it is desired for the wheel hub to not be driven, pressure fluid may be communicated to the control pressure chamber thus biasing the diaphragm in the direction of the wall. The clutch ring will slide along therewith and internal teeth will be removed from the externally tooth section of the cylindrical axle hub. Even though the axle shaft is being driven, this drive will not be transmitted through to the clutch ring, the external body and through to the wheel hub since the internal teeth are not received upon the externally toothed section of the cylindrical axle hub.

When it is desired to drive the wheel hub, the pressure in orifice will be removed, or alternatively a vacuum will be applied to this passage. The direction of the spring bias will depend on whether high-pressure of vacuum pressure is sent to the control pressure chamber. This will draw the diaphragm in a direction away from the wall and will cause the clutch ring to slide along therewith. The clutch ring internal teeth will now align with the external tooth section of the cylindrical axle hub. Drive will be transmitted from the axle shaft through to the clutch ring which in turn will drive the external body through the teeth. The wheel hub is thus driven to rotate.

In this type of free-wheeling hub assembly, the relative pressure between the diaphragm chamber and the pressure chamber controls the position of the diaphragm. The pressure in the diaphragm chamber resists movement of the diaphragm in the direction of the wall. Thus, the pressure in the diaphragm chamber must be considered in conjunction with the strength of the spring biasing the diaphragm either towards or away from the wall and the pressure that is communicated to the control pressure chamber. If the pressure in the diaphragm chamber is greater than estimated, the clutch ring could be engaged when it is not desired. Alternatively, a lower than estimated pressure could cause the clutch ring to not engage or only partially engage when four-wheel drive is desired. If this relative pressure between the two chambers is not accurately monitored, it is difficult to control the position of the clutch ring.

The relative pressure between the pressure chamber and the diaphragm chamber can vary greatly, due to the elevation or temperature variation. For this reason, the prior art has vented the diaphragm chamber to atmosphere in an attempt to accurately control the pressure within the chamber. A vent opening with a powdered metal filter received therein is disposed in the wall. This vent communicates the diaphragm chamber to atmosphere in order to equalize their respective pressures. This connection of the diaphragm chamber to atmospheric pressure eliminates any extreme fluctuations in the relative pressure between the two chambers, which could affect the positioning of the clutch ring.

Problems sometimes arise with this type of prior art device since the filter can easily become clogged and prevent venting of the chamber. A free-wheeling hub assembly mounts a wheel and is quite close to the ground. The filter can easily become clogged with dirt. This filter is exposed to all kinds of impurities, especially in four-wheeled driving, which often occurs off paved roadways. When the filter plugs up, the chamber is sealed as if there was no vent at all. In addition, when the wheel hub is submerged water may be sucked into the chamber through the filter. This can render the mechanism inoperable and may damage the delicate components, and in particular the diaphragm. A filter in this location does not allow for easy maintenance and cleaning and may easily be clogged by paint, polishing wax or any similar products that may be applied to the vehicle. A powdered metal filter will tend to have some water in it due to moisture in the atmosphere and in colder temperatures, this water could freeze and clog the filter.

For this reason, it is an object of the present invention to disclose an improved vent for the diaphragm chamber of a free-wheeling hub assembly in which the chamber is vented to a clean area without contaminants or impurities.

More particularly, it is an object of the present invention to disclose an improved vent for a free-wheeling hub assembly in which the chamber is vented to a clean area inside the engine compartment of the vehicle.

SUMMARY OF THE INVENTION

The present invention discloses a vent arrangement for the diaphragm chamber of a free-wheeling hub assembly in which a bore extends through the external body of the hub assembly and is connected to a bearing chamber between the spindle and the wheel hub. The bearing chamber is sealed from both the control pressure chamber and the area within the spindle. A second bore communicates with the bearing chamber and extends through a radial flange on the spindle and is connected to a tube which leads to the chamber inside a vehicle engine compartment. The inside of the engine compartment is a relatively clean air space that will avoid contamination of the diaphragm chamber by impurities such as dirt, dust, ice, or the like.

These and other features and objects of the present invention can be best understood upon reading the following specification and appended drawings, of which the following is a brief description thereof.

BRIEF DESCRIPTION OF THE PREFERRED EMBODIMENT

Figure 1:
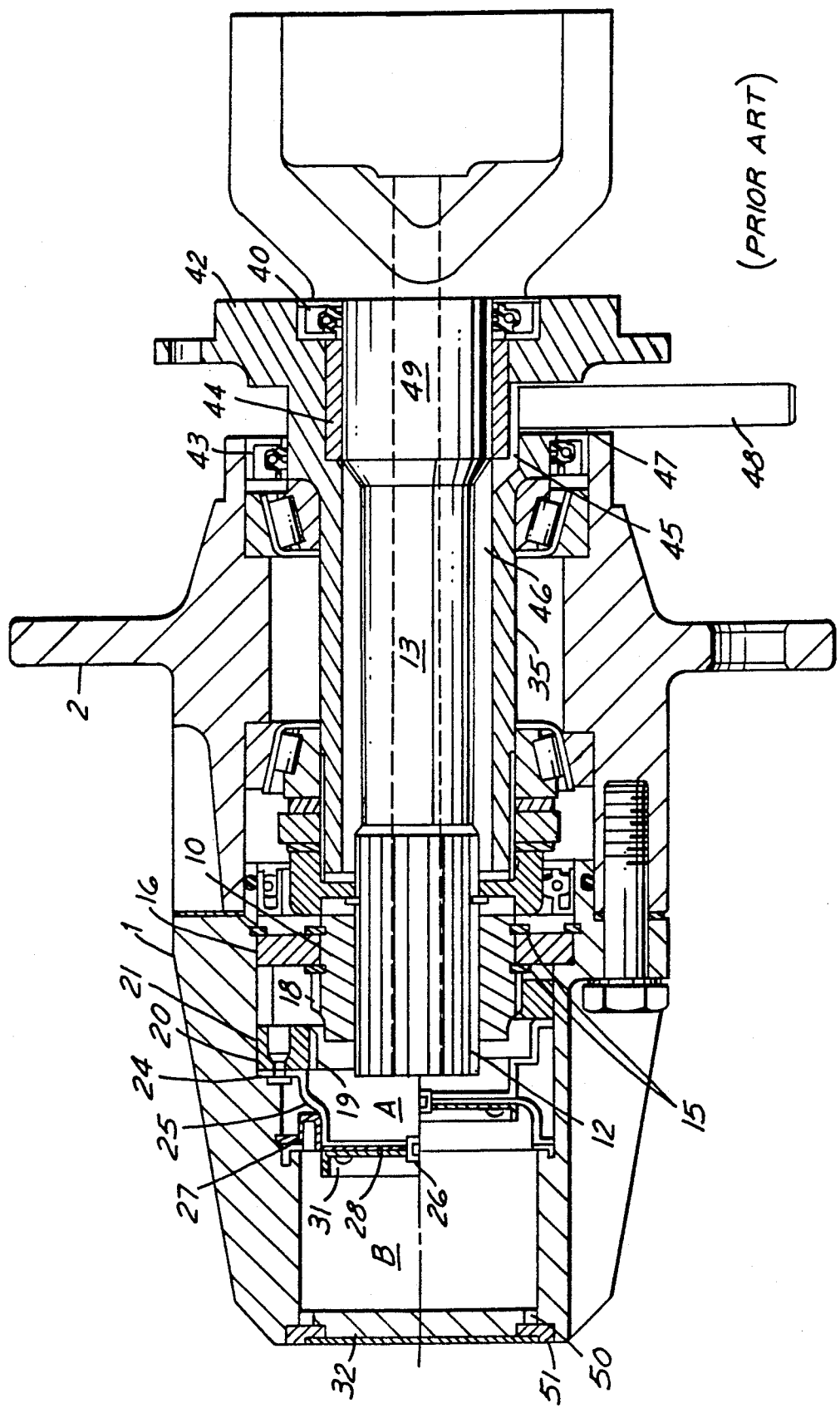
FIG. 1 shows a prior art free-wheeling hub assembly.

FIG. 1 illustrates a free-wheeling hub assembly as is now Known in the prior art. In this assembly, an external body 1 is connected to rotate with a wheel hub 2. A cylindrical axle hub 10 is received within external body 1 and has internal splines that are received in external splines 12 formed on axle shaft 13. Snap rings 15 secure a bearing 16 to the cylindrical axle hub 10. Thus, wheel hub 2 and axle shaft 13 may rotate relative to each other, while the vehicle is in two-wheel-drive mode.

Wheel hub 2 will typically receive a rim and tire and is one of the selectively driven wheels of a four-wheel drive vehicle. The operator of the vehicle may selectively engage the two wheels that have free-wheeling hub assembly to provide four-wheel drive to the vehicle.

An external toothed section 18 on cylindrical axle hub 10 is associated with internal teeth 19 on a clutch ring 20. Clutch ring 20 has locking teeth 21 that are received within slots or grooves in the inner periphery of the external body 1 to drive the external body along therewith. Due to teeth 21 clutch ring 20 can slide longitudinally within external body 1. Clutch ring 20 can also slide on externally toothed section 18 of the axle hub 10.

Radial projections 24 connect an actuating disc 25 to clutch ring 20 and a central rivet 26 connects diaphragm 27 to actuating disc 25. A disc or backing member 28 receives central rivet 26 and prevents the diaphragm 27 from being torn. In addition, disc 28 has a cylindrically upstanding portion 31 that will abut an end wall 32 of external housing 1 and prevent excess deformation of diaphragm 27. Upstanding portion 31 is a stop means for the diaphragm 27. Spindle 35 receives axle shaft 13 within its inner periphery and the wheel hub 2 outside its outer periphery. Spindle 35 is fixed to the vehicle frame. An oil seal 40 seals the opposite end of spindle 35 from atmosphere. A flange 42 is part of spindle 35 and extends radially outwardly. A seal 43 is received between spindle 35 and wheel hub 2. A bearing 44 is received within spindle 35 and supports the axle 13.

Fluid, which may be hydraulic pressure, air or vacuum pressure is communicated to a control pressure chamber A in one of two ways. In one embodiment, a tube 48 is received in an orifice 47 formed in spindle 35. The tube 48 is communicated to a canal or passage 45 which communicates with a radial spacing 46 between the axle shaft 13 and the inner periphery of spindle 35. From the radial spacing 46, fluid is communicated into control pressure chamber A to control the pressure within the chamber.

Alternatively, a passage 49 is formed within the inner periphery of axle shaft 13 and communicates the fluid to control pressure chamber A through the axle shaft 13.

A vent opening 50 is formed in end wall 32 of external housing 1 and will allow venting of the pressure within diaphragm chamber B. Powdered metal filter 51 is received within vent opening 50.

A spring will bias the diaphragm 27 to a position in opposition to the pressure with the control pressure chamber A. If a high pressure fluid is sent to the control pressure chamber A, the spring will bias the diaphragm away from the end wall 32. If a vacuum pressure is utilized, the spring will bias the diaphragm 27 toward the end wall 32.

The basic operation of this prior art device will be explained. When it is desired for the wheel hub 2 to not be driven, pressure fluid is communicated to chamber A thus biasing diaphragm 27 in the direction of wall 32. Chamber A is thus a control pressure chamber. Clutch ring 20 will slide along therewith and internal teeth 19 will be removed from the externally tooth section 18 of cylindrical axle hub 10. This is shown in the top half of FIG. 1. Even though axle shaft 13 is being driven, this drive will not be transmitted through to the clutch ring 20, the external body 1 and through to wheel hub 2 since the internal teeth 19 are not received upon the externally tooth section 18 of cylindrical axle hub 10.

When it is desired to drive the wheel hub 2, the pressure in orifice 49 will be removed, or alternatively a vacuum will be applied to this passage. It is to be understood that, a spring will normally bias diaphragm either toward or away from wall 32. The direction of the spring bias will depend on whether high-pressure of vacuum pressure is sent to chamber A. Diaphragm 27 is drawn in a direction away from wall 32 and will cause clutch ring 20 to slide along therewith. The internal teeth 19 will now align with the external tooth section 18 of the cylindrical axle hub 10. This is shown in the bottom half of FIG. 1. Drive will be transmitted from the axle shaft 13 through to the clutch ring 20 which in turn will drive the external body 1 through teeth 21. The wheel hub 2 is thus driven to rotate.

In this type of free-wheeling hub assembly, the relative pressure between the diaphragm chamber B and the pressure chamber A controls the position of the diaphragm 27. The pressure in chamber B resists movement of diaphragm 27 in the direction of wall 32. Thus, the pressure in chamber B must be considered in conjunction with the strength of the spring bias on the diaphragm 27 and the pressure that is communicated to control pressure chamber A. If the pressure in the diaphragm chamber B is greater than estimated, the clutch ring 20 could be engaged when it is not desired. Alternatively, a lower than estimated pressure could cause the clutch ring 20 to not engage or only partially engage when four-wheel drive is desired. If this relative pressure between the two chambers is not accurately monitored, it is difficult to control the position of the clutch ring 20.

The relative pressure between the pressure chamber A and the diaphragm chamber B can vary greatly, due to the elevation or temperature variations. For this reason, the prior art has vented chamber B to atmosphere in an attempt to accurately control the pressure within chamber B. Vent opening 50 with a powdered metal filter 51 received therein is disposed in wall 32. This vent communicates the atmosphere and chamber B in order to equalize their respective pressures. This connection of the chamber B to the atmosphere eliminates any extreme fluctuations in the relative pressure between chambers A and B.

Problems sometimes arise with this type of prior art device since filter 51 can easily become clogged and prevent venting of chamber B. A free-wheeling hub assembly mounts a wheel and is quite close to the ground. Filter 51 can easily become clogged with dirt. This filter 51 is exposed to all kinds of impurities, especially in four-wheel driving, which often occurs off paved roadways. When the filter 51 plugs up, chamber B is sealed as if there was no vent at all.

In addition, when wheel hub 2 is submerged water may be sucked into chamber B through the filter 51. This can render the mechanism inoperable and may damage the delicate components, and in particular diaphragm 27. This filter in this location does not allow for easy maintenance and cleaning and may easily be clogged by paint, polishing wax or any similar products that may be applied to the vehicle. This type of filter will tend to have some water in it due to moisture in the atmosphere and in colder temperatures, this water could freeze and clog the filter.

The free-wheeling hub assembly of the present invention will now be described with reference to FIG. 2. The bulk of the members illustrated in FIG. 2 have similar functions to those described with reference to FIG. 1 and thus will not be described again.

Figure 2:
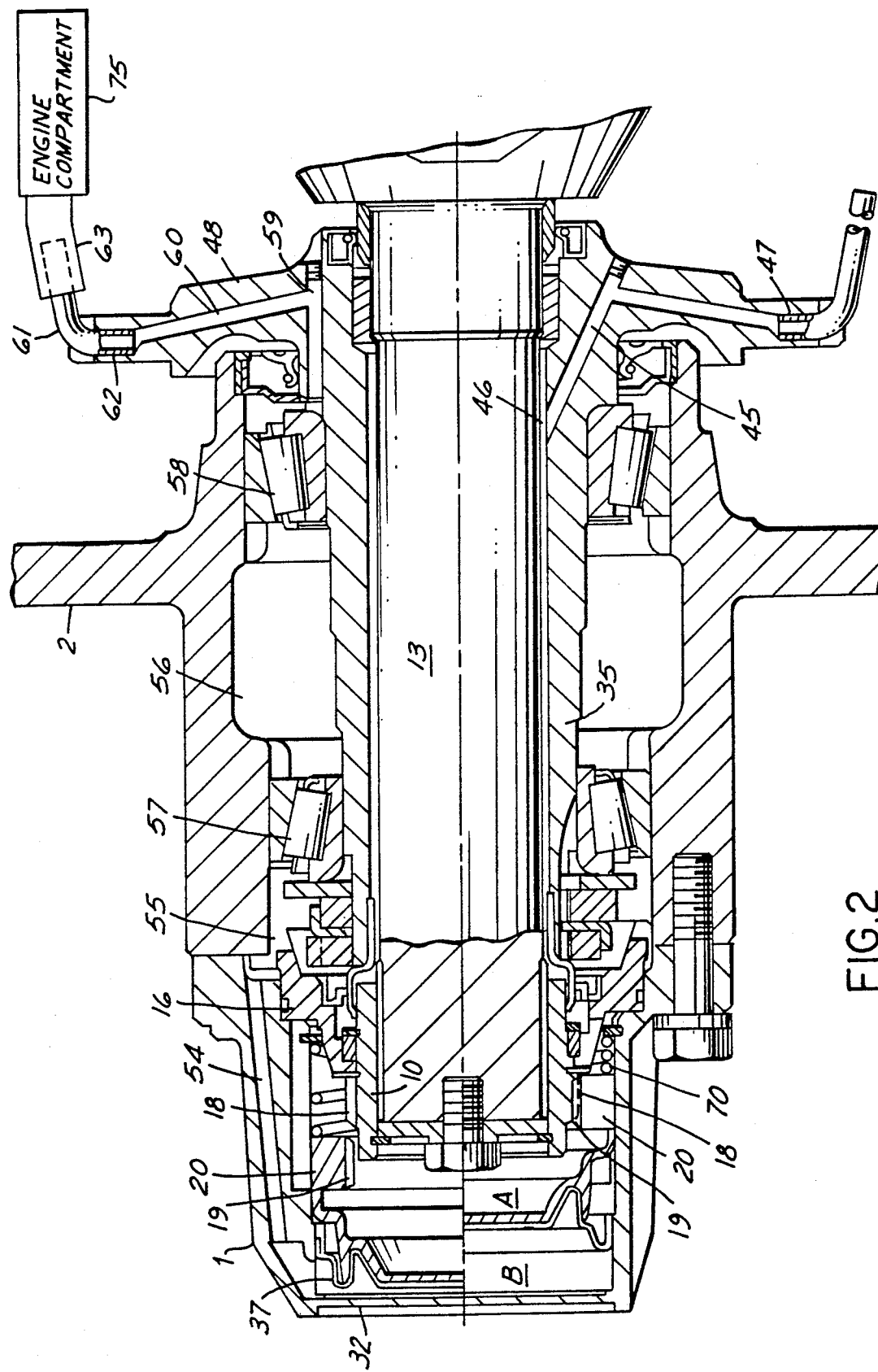
FIG. 2 is a longitudinal cross-section through a free-wheeling hub assembly having the improved vent means of the present invention.

As shown in FIG. 2, diaphragm 37 separates diaphragm chamber B from control pressure chamber A. Wall 32 of external housing 1 is solid and does not have any filters or openings. It is to be understood that diaphragm chamber B is tightly sealed from chamber A and it is important to the control of the free-wheeling hub assembly of this invention that diaphragm chamber B is continuously connected to the atmosphere so that the pressure necessary within chamber A to control the position of diaphragm 37 and thus the clutch ring 20 can be predicted.

In the disclosed embodiment of this invention, a spring 70 will normally bias diaphragm 37 toward wall 32. A vacuum pressure is communicated to the control pressure chamber A through tube 47, canal 45 and space 46 to bias diaphragm 37 against the force of spring 70. As should be understood, when the vacuum pressure is communicated to tube 47 it will bias the diaphragm 37 away from wall 32 and thus engage the clutch ring 20 so it is driven by axle shaft 13. This is shown in the bottom half of FIG. 2. However, when it is desired to disengage wheel hub 2, the vacuum pressure within tube 47 will be disconnected and spring 70 will bias clutch ring 20 and the diaphragm 37 toward wall 32. As clutch ring 20 moves towards the wall 32, the internal teeth 19 will be removed from externally toothed section 18 of axle hub 10 and drive will no longer be transmitted from axle shaft &3 to the wheel hub 2. This is shown in the top half of FIG. 2.

As should be understood, a high pressure fluid can be used in place of the vacuum pressure.

In order to maintain diaphragm chamber B continuously connected to the atmosphere, bore 54 extends through external body 1 from the diaphragm chamber B to a bearing chamber 55 that is sealed from control pressure chamber A and is also sealed from the space 46 within spindle 35. Thus, bearing chamber 55 is both free from any contaminants that may be within chamber A or space 46 and is also at the same pressure as chamber B. Chamber 55 is connected to a second bearing chamber 56 through a bearing 57. Chamber 56 is connected through bearing 58 to bore 59 formed in the radial flange 48 of the spindle 35. Bore 60 extends radially outwardly through flange 48 from bore 59 and into an opening 62 that receives a tube connector 61. Tube 63 is received upon tube connector 61 and extends to a clean space inside the engine compartment 75 of a vehicle.

By this arrangement, the invention avoids exposure of diaphragm chamber B to any contaminants that could clog the various vent lines and could prevent the continued connection of chamber B to the atmosphere. In addition, the invention ensures that chamber B is adequately vented and always at atmospheric pressure, thus allowing accurate control of the free-wheeling hub assembly.

A preferred embodiment of the present invention has been disclosed, however it is to be understood that a worker in the art would realize that certain modifications are within the scope of this invention and thus reference should be had to the appended claims to determine the true scope of this invention.

I claim:

1. A free-wheeling hub assembly comprising:
a driven axle;
a wheel hub disposed radially outwardly of said axle;
a fixed spindle member received radially between said wheel hub and said axle, receiving said axle at an inner peripheral portion thereof and mounting said wheel hub at an outer peripheral portion thereof;
means to selectively connect said driven axle to drive said wheel hub including a source of pressure selectively connected to a control pressure chamber, a diaphragm having first and second faces, said diaphragm sealing said control pressure chamber upon said first face of said diaphragm and defining a second chamber upon said second face of said diaphragm, spring means to bias said diaphragm in a direction against the pressure in said control pressure chamber, the connection of pressure to said control pressure chamber moving said diaphragm against said spring bias to selectively engage or disengage said driven axle to drive said wheel hub; and
vent means connecting said second chamber to a space that is relatively free from dirt.

2. A free-wheeling hub assembly as recited in claim 1, and wherein an external body portion is fixed to said wheel hub, said external body portion receiving said diaphragm at an inner peripheral portion thereof, said vent means including a passage extending through said external body portion.

3. A free-wheeling hub assembly as recited in claim 2, and wherein said passage within said external body portion extends through said body portion from said second chamber in a direction towards said source of pressure.

4. A free-wheeling hub assembly as recited in claim 3, and wherein said vent further includes a bearing chamber disposed radially between said spindle and said wheel hub, said passage through said external body portion connecting said second chamber into said bearing chamber, a bore within said spindle connected to said bearing chamber, said bore connected to a tube that extends to a space that is relatively clean.

5. A free-wheeling hub assembly as recited in claim 4 for use in a vehicle having an engine compartment, and wherein said tube extending to a space that is relatively clean extends to a position within the engine compartment of the vehicle.

6. A free-wheeling hub assembly as recited in claim 1, and wherein said source of pressure is a source of vacuum pressure and said spring means biases said diaphragm in a direction to disengage said means to selectively connect, connection of vacuum pressure to said control pressure chamber causing said diaphragm to move against the bias of said spring means to engage said means to selectively connect.

7. A free-wheeling hub assembly as recited in claim 1, and wherein said source of pressure is a source of high-pressure, said spring means biasing said diaphragm in a direction to engage said means to selectively connect, connection of said high-pressure to said control pressure chamber causing said diaphragm to move in a direction to disengage said means to selectively connect.

8. A free-wheeling hub assembly as recited in claim 1 for use in a vehicle having an engine compartment, and wherein said space that is relatively free from dirt is a space within the engine compartment of the vehicle.

9. A free-wheeling hub assembly as recited in claim 1, and wherein said means to selectively connect includes a clutch ring that is connected to said diaphragm, and biased with said diaphragm, said clutch ring having internal teeth at an inner periphery thereof, said driven axle having external teeth at an outer peripheral tooth portion thereof, movement of said clutch ring being such that said internal teeth on said clutch ring align with said external teeth of said driven axle causing said driven axle to drive said wheel hub, movement of said clutch ring to a position such that said internal teeth of said clutch ring do not align with said outer peripheral tooth portion of said driven axle causing disengagement of said means to selectively connect.

10. A free-wheeling hub assembly as recited in claim 1, and wherein said control pressure chamber is disposed adjacent said driven axle, said second chamber being spaced longitudinally from said driven axle, and said diaphragm being disposed intermediate said control pressure chamber and said second chamber.

11. A free-wheeling hub assembly as recited in claim 1, and further wherein said vent means include a bearing chamber disposed between said fixed spindle member and said wheel hub, at least two bearings being disposed in said bearing chamber and supporting said wheel hub for rotation on said fixed spindle, said at least two bearings allowing passage of pressurized air therethrough such that they are part of said vent means.

12. A free-wheeling hub assembly comprising:
a driven axle;
a spindle fixed to a vehicle frame, said spindle receiving said driven axle at a central portion thereof, said driven axle extending longitudinally through said spindle;
a wheel hub received radially outside said fixed spindle and connected to the wheel of a vehicle, said wheel hub being mounted for rotation with respect to said fixed spindle, at least two bearings being disposed between said spindle and said wheel hub;
means to selectively connect said driven axle to drive said wheel hub including a first member fixed to said axle at a longitudinally position outside of said spindle, said first member having an external toothed portion at an outer periphery thereof, a clutch ring slidably received within, and constrained to rotate with said wheel hub, said clutch ring having internal teeth at an internal position thereof, said internal teeth of said clutch ring aligning with said external toothed portion of said first member to cause said driven axle to drive said clutch ring rotationally, thus causing said wheel hub to rotate along therewith;
a diaphragm fixed to said wheel hub and also fixed to said clutch ring, said diaphragm being positionable to move said clutch ring to positions where said internal teeth of said clutch ring do not align with said external toothed portion of said first member and to positions where said internal teeth of said clutch ring do align with said external toothed portion of said first member thus creating selective engagement of said drive between said driven axle and said wheel hub, said diaphragm being disposed longitudinally spaced from said driven axle;
a control pressure chamber being longitudinally disposed between said diaphragm and said driven axle, said control pressure chamber being selectively exposed to a source of pressure fluid;

a second chamber disposed on a longitudinal side of said diaphragm away from said control pressure chamber, the pressure within said second chamber resisting movement of said diaphragm due to the pressure within said control pressure chamber, and a wall means attached to said wheel hub, said wall means being disposed longitudinally spaced from said diaphragm in a direction away from said driven axle such that said wall means and said diaphragm define longitudinal extents of said second chamber; and vent means for venting said second chamber to a space that is relatively free from dirt; said vent means including a first bore extending through a portion of said wheel hub from said second chamber in a direction towards said driven axle, said first bore extending through a bearing chamber formed between said fixed spindle and said wheel hub.

13. A free-wheeling hub assembly as recited in claim 12, and wherein said vent means further having a second bore formed in said spindle and connecting said bearing chamber to said space that is relatively clean.

14. A free-wheeling hub assembly as recited in claim 13, and wherein said second bore is connected to a third bore that extends radially outwardly through said spindle to a tube.

15. A free-wheeling hub assembly as recited in claim 14, and wherein said tube is connected to a piece of tubing extending to said space that is relatively clean.

16. A free-wheeling hub assembly as recited in claim 15 or use in a vehicle having an engine compartment, and wherein said space that is relatively clean is a space within the engine compartment of the vehicle.

* * * * *